United States Patent [19]
Adell

[11] Patent Number: 4,570,383
[45] Date of Patent: Feb. 18, 1986

[54] DOOR EDGE GUARD

[75] Inventor: Robert Adell, Sunnyvale, Tex.

[73] Assignee: U.S. Product Development Company, Sunnyvale, Tex.

[21] Appl. No.: 533,689

[22] Filed: Sep. 19, 1983

[51] Int. Cl.⁴ .............................. B60J 5/00; E05F 7/00
[52] U.S. Cl. .......................................... 49/462; 52/716
[58] Field of Search ..................... 49/462, 489; 52/716

[56] References Cited

U.S. PATENT DOCUMENTS 2,733,097  1/1956  Stevens ................................. 49/462
3,706,173 12/1972  Taylor ............................... 49/462 X
4,220,681  9/1980  Narita ............................... 52/716 X

FOREIGN PATENT DOCUMENTS

1033883  7/1958  Fed. Rep. of Germany ........ 49/489
 660705  9/1964  Italy ...................................... 49/462

Primary Examiner—Kenneth Downey
Attorney, Agent, or Firm—Stephenson and Boller

[57] ABSTRACT

Improvements in edge guards for the trailing edges of swinging closures are disclosed. The improvements include modifications to the trailing edges of the swinging closure themselves to accept new and unique edge guards. One improvement relates to the inclusion of a recess in the trailing edge of a swinging closure and/or the edge of an adjacent body panel with the edge guards having a cooperative association with such recesses. The edge guards may be entirely of a non-metallic material or of insulated material.

23 Claims, 32 Drawing Figures

DOOR EDGE GUARD

BACKGROUND AND SUMMARY OF THE INVENTION

This invention relates to door edge guards of the type used on the trailing edges of automobile doors.

Applicant is the originator of the automobile door edge guard, and he has designed, developed, and manufactured original equipment door edge guards for the domestic automobile industry for many years. He has devoted resources to continuing improvements of this important product, and these are reflected by his patents, both issued and pending, on this subject.

The present invention is directed to further improvements in door edge guards and is particularly concerned in certain respects to improvements in the mounting of edge guards on doors.

While insulated metallic edge guards of the self-retaining type are superior to all other proposed types, applicant in striving for continual improvement has perceived that revisions to the door structure itself can be employed for accommodating door edge guards other than insulated metallic edge guards. Insulated metallic edge guards are desirable because they are compatible with the prevailing manufacturing procedures for fabricating automobile doors. Present doors are manufactured by joining inner and other stamped door panels around their perimeters. The completed door has a hem-type perimeter in which the outer door panel's perimeter is wrapped around the inner door panel's perimeter. An insulated metal edge guard fits nicely onto such a door.

The present invention proposes certain revisions to the prevailing door construction to accept edge guards which may be other than self-retaining insulated metal edge guards. It is nonetheless possible that insulated metal self-retaining edge guards could be used with the revised door constructions proposed herein.

One possibility arising with the present invention is that a strictly plastic edge guard may be employed to give satisfactory door edge protection. Another possibility is that satisfactory door edge protection may be given in conjunction with concealment of the crack which exists between a door and adjacent pillar when the door is closed.

Automobile manufacturers have devoted extensive efforts toward reducing the size of such cracks through expensive body fit improvement programs. Improved fits are considered to promote customer acceptance. Unfortunately, the Lincoln-Mercury Division of Ford Motor Company when to such lengths to accomplish an improved door fit on the 1982 Continental that is was unable to assemble door edge guards to the doors on the regular assembly line. This deprived the customer of obtaining original equipment door edge guards on a new car from the factory as an installed option. If he wanted edge guards, he had to pay for a door readjustment charge and could obtain edge guards only as an accessory.

It should be remembered that the amount of paint covering the rounded door edge is very thin and hence very susceptible to damage if unprotected by an edge guard. Therefore, door edge guards are a desirable product. In this particular instance, the automobile manufacturer undoubtedly deprived itself of profit it would otherwise have enjoyed had it been able to offer door edge guards as original equipment. At least some customers were probably deprived of edge guards since they did not want to incur the extra charge for door readjustment.

Automobile manufacturers are also today concerned with fuel economy. Better fuel mileage is obtainable through more aerodynamic designs and weight reductions.

In certain respects, the present invention is well suited to further these objectives.

The foregoing features, advantages, and benefits of the invention, along with additional new ones, will be seen in the ensuing description and claims, which should be considered in conjunction with the accompanying drawings. The drawings disclose a preferred embodiment of the invention according to the best mode contemplated at the present time in carrying out the invention.

BRIEF DESCRIPTION OF THE DRAWINGS

FIG. 15 is a transverse cross sectional view illustrating one door edge guard which may be used with the door and pillar configurations of FIGS. 11-14.

FIGS. 16a, 16b and 16c are respective modified forms of the edge guard of FIG. 16.

DESCRIPTION OF THE PREFERRED EMBODIMENT

Figure 1:
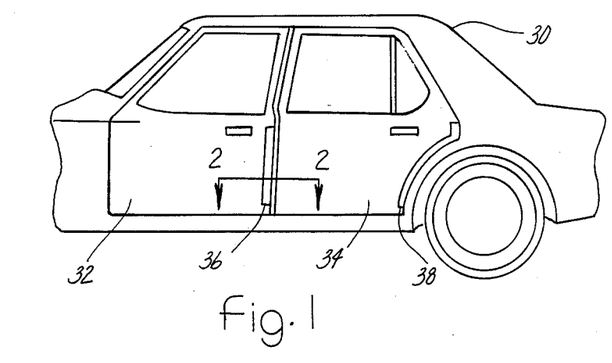
FIG. 1 is a side elevational view of a portion of an automobile containing door edge guards of the present invention.

FIG. 1 shows an automobile 30 having front and rear doors 32, 34 containing door edge guards embodying principles of the invention. The door edge guards are identified by the reference numerals 36, 38 and by way of example are shown to be generally co-extensive in length with the trailing edges of the respective doors to which they are applied.

In accordance with the invention, certain modifications are made to conventionally practiced door fabrication techniques. Specifically, enlargements are made in where the outer panel 40 wraps around the inner panel 42. These enlargements are designated by the numerals 44 in FIG. 2.

Figure 2:
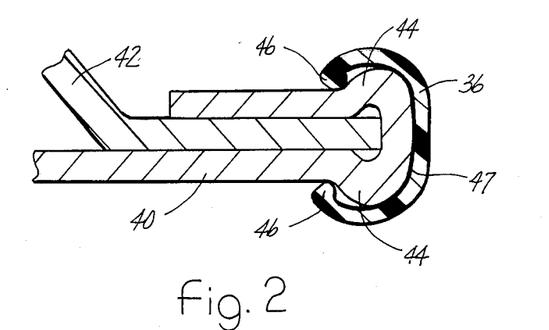
FIG. 2 is an enlarged transverse cross sectional through one of the edge guards in FIG. 1 as taken along line 2—2.

Door edge guard 36 has its ends fitted over enlargements 44. For this purpose the edge guard is formed into a C-shape cross section having inwardly directed beads 46 at the ends. The edge guard is fabricated from any suitable material, plastic for example. Assembly of the edge guard onto the door is accomplished by pushing the edge guard onto the door edge. The plastic has sufficient resilience to fit over and around the enlargements on the door edge. The plastic possesses sufficient toughness to provide door edge protection. It may also be colored to match the color of the door if desired.

Retention of the edge guard on the door edge is accomplished by any suitable means an/or procedure. For example, an adhesive cement 47 may be applied to the interior of the U-shaped cross section so that when the edge guard is applied to the door edge an adhesive bond is formed between substantially the entire inside of the channel cross section and the portion of the door edge covered thereby. Any suitable form of adhesive may be used. For example, an air drying adhesive may be used, or a non-air drying pressure sensitive adhesive which cures upon application of pressure at the time of installation may be used. Other means and/or procedures such as cold or hot glue, bonding by heat, pressure, chemicals presently known or newly developed may be used.

Figure 3:
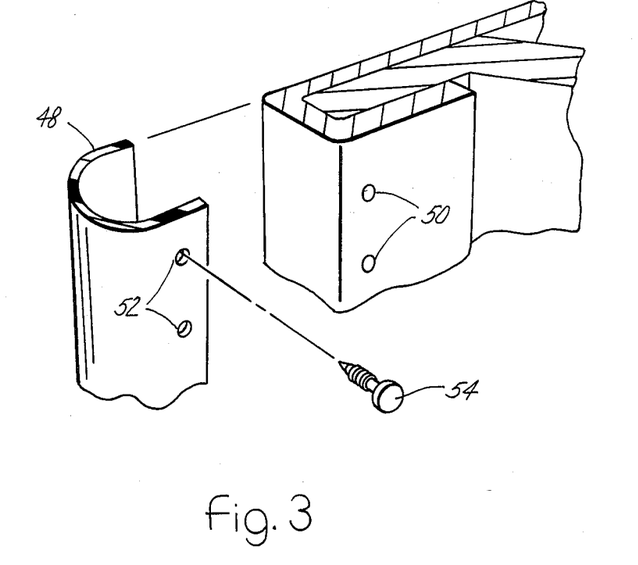
FIG. 3 is a fragmentary perspective view of another embodiment.

FIG. 3 shows another embodiment of edge guard 48. This edge guard has a U or C shape and can be made of a material having a similar character to that of the previous embodiment. Rather than the door having the enlargements 44, the door of FIG. 3 has a series of vertical holes 50. The edge guard is provided with a series of matching holes 52 in its inner leg. Fasteners 54 are passed through holes 52 and into holes 50 to secure the edge guard in place. The holes may extend either partially or fully through the door edge. Where they extend fully through the door edge, they will be concealed by the outer leg of the edge guard.

Figure 4:
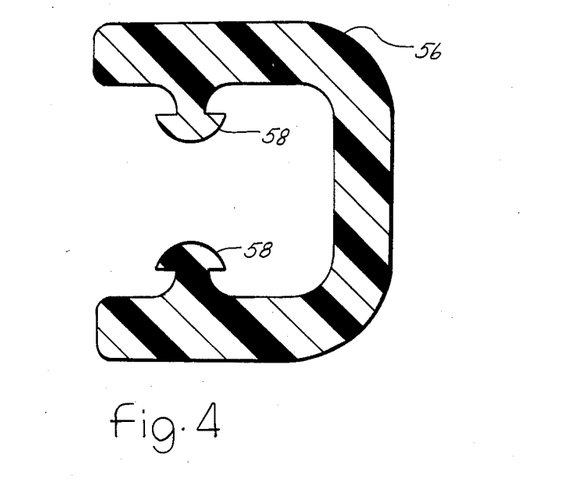
FIG. 4 is a cross sectional view similar to FIG. 2 illustrating another embodiment.

FIG. 4 shows an embodiment 56 with a series of tips 58 which have a pattern matching holes 50. The edge guard is installed by fitting it over the door edge and inserting tips 58 into holes 50. Because of the provision of the series of tips 58, edge guard 56 is not readily suited for extrusion, and is therefore preferably a molded piece. This embodiment will require holes in both inside and outside of the door edge to receive the protruberances or tips on the inside of both the inner and outer legs. Alternatively, it would be possible to embody this sort of a construction in an extrusion with the door being provided with slots into which the extruded protruberances are insertable, the slots being in place of the holes.

Figure 5:
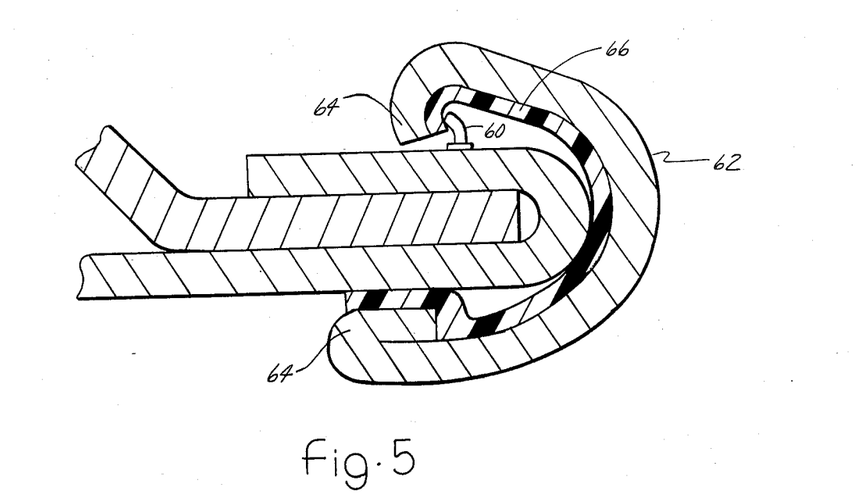
FIG. 5 is a cross sectional view illustrating another embodiment.

FIG. 5 shows a construction in which the door is modified to include a weldment 60, or series of weldments, which are used to retain the edge guard. The edge guard 62 of FIG. 5 possesses inwardly directed barbs 64 at the ends of its legs. The edge guard is made of metal and includes an insulated liner 66. The weldment construction is hook-like, and the barb 64 on the inner leg of the edge guard hooks around the weldment. An insulated metal edge guard is preferred for this type of installation because no accommodations need be made to the outside surface of the door edge. The outer leg of the insulated metal edge guard will have a certain retentive engagement with the door.

Figure 6:
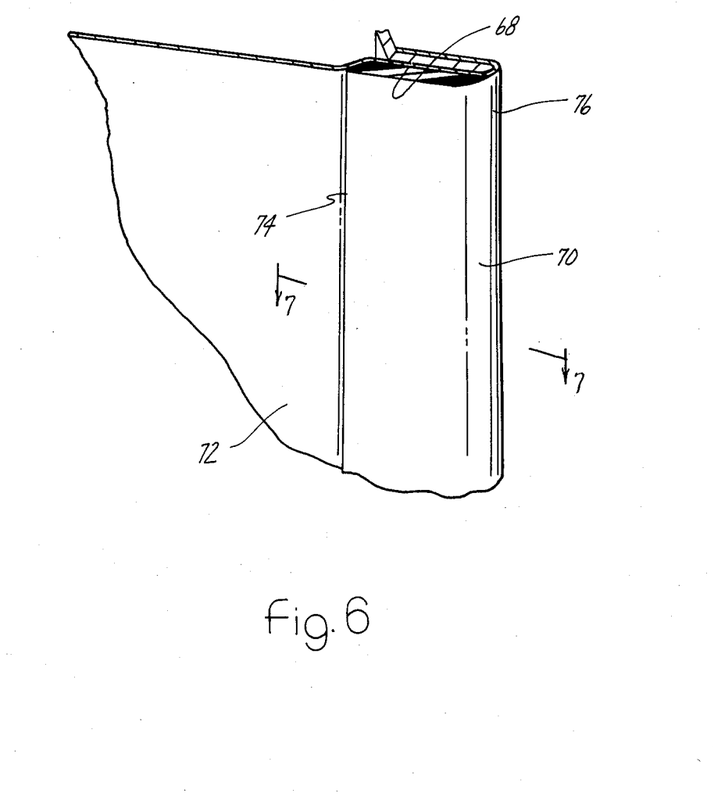
FIG. 6 is a perspective view illustrating a portion of another embodiment.
Figure 7:
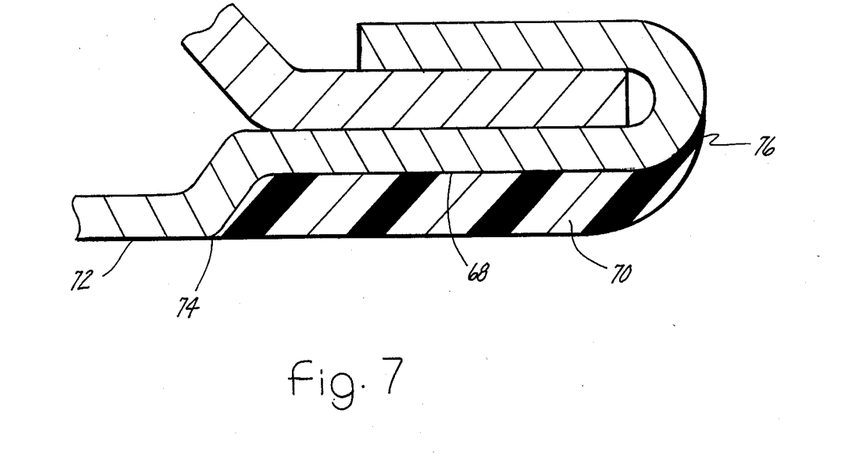
FIG. 7 is a transverse cross sectional view through a portion of FIG. 6 as taken along line 7—7.

FIGS. 6 and 7 depict a modification to the outer surface of the door edge. Specifically, the door is provided with a recess 68 which is depressed inwardly from the nominal outer door surface. A door edge guard 70 fits with substantial conformity into this recess. The edge guard has a thickness corresponding to the depth of the recess so that the outer surface of the edge guard forms a continuation of the nominal outer door surface 72. The leading edge of the edge guard may be provided with a feathered fit 74 with the door surface. The trailing edge 76 of the edge guard may be curved to blend with the hem where the outer door panel wraps around the inner door panel. The extent to which the trailing edge 76 extends around the curve of the hem may be selected as deemed appropriate for any given door.

The construction provides door edge protection with an aesthetically pleasing appearance. The edge guard may be colored to match the color of the painted door, or it may be a complementary or contrasting color. It may be fabricated from any suitable plastic. By virtue of its flushness it promotes a smooth aerodynamic surface.

Figure 8:
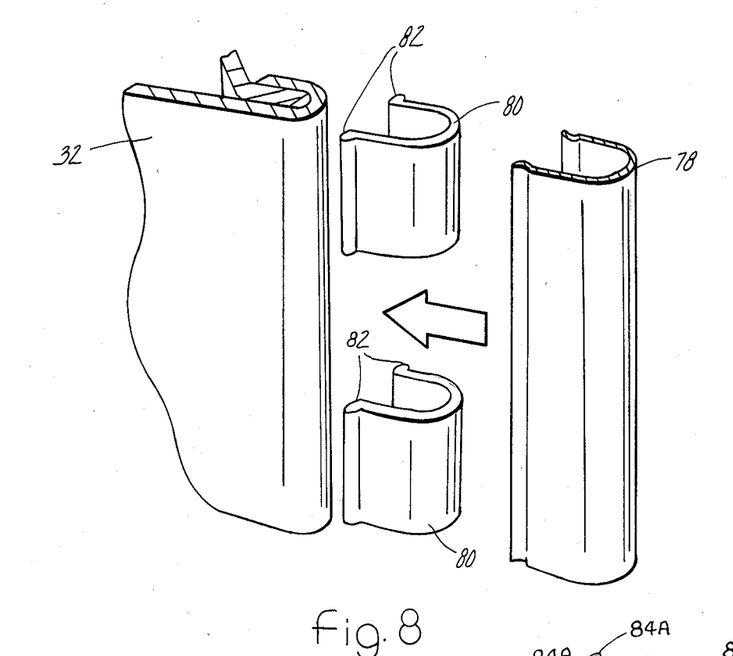
FIG. 8 is an exploded perspective view illustrating another embodiment.

FIG. 8 illustrates another installation for an edge guard 78 which is made of metal. Edge guard 78 is in the shape of a channel and is preferably self-retaining by virtue of the resilient retention forces applied to opposite sides of the door edge via its legs. Rather than being applied directly to the door edge, it is applied over two or more insulating inserts 80 which are spaced apart along the door edge. This illustrates that the insulating material need not line the full interior of the metal channel. The inserts 80 are of U or C shape and include beads 82 at their ends. When the metal edge guard 78 is fully fitted over the inserts, the beads may remain exposed, or optionally removed by trimming. Installation is preferably accomplished by placing the inserts on the door edge first and then pushing the metal channel over them or alternatively by placing the inserts within the channel first and then pushing the insert-containing channel onto the door edge.

Figures 9, 9A, 9B:
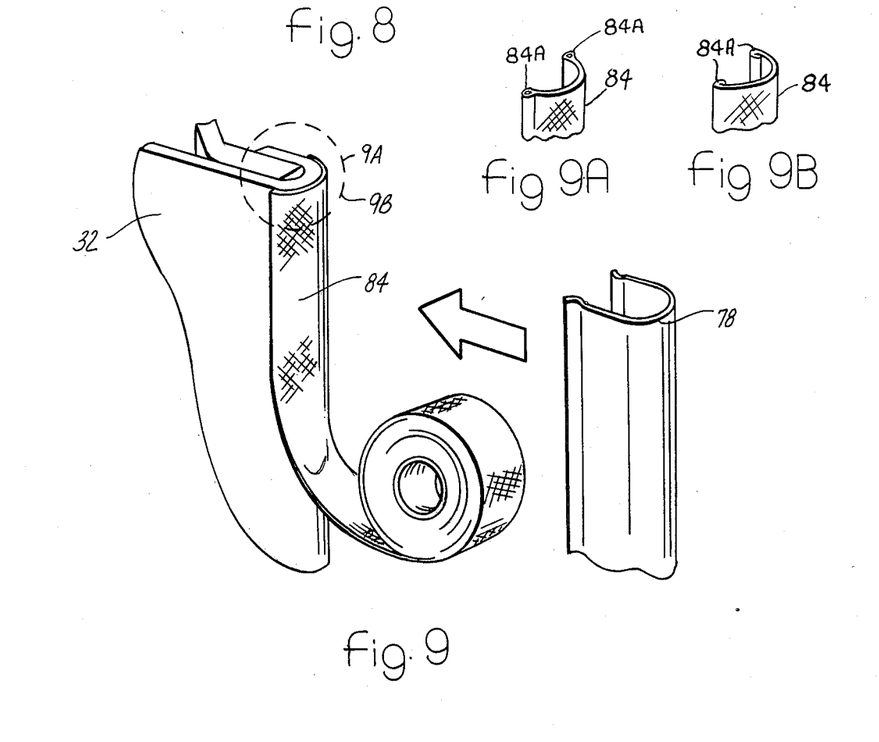
FIG. 9 is an exploded perspective view illustrating still another embodiment.

The arrangement of FIG. 9 demonstrates yet another possibility for insulating a metal edge guard channel from a door. The insulating material is taken from a roll of tape, being applied in the manner shown. The tape 84 is any suitable type, for example, it could be what is commonly referred to as strapping tape, and it is applied to extend over both sides of the door edge and to be co-extensive with the edge guard. The edge guard fits over the tape such that the tape insulates the edge guard from the door with the ends of the legs of the metal channel 78 bearing through the tape against opposite sides of the door edge. This arrangement could also be used to mount other than a self-retaining metal edge guard. For instance, it could be used to mount a strictly plastic edge guard where suitable adhesive is applied to opposite sides of the tape.

Figure 10:
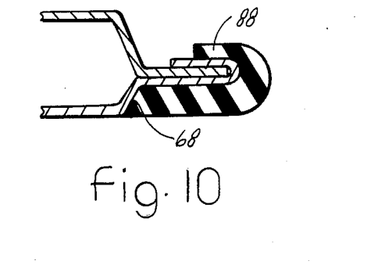
FIG. 10 is a cross sectional view similar to FIG. 7 illustrating another embodiment.

FIG. 10 depicts another type of edge guard which in certain respects is similar to that of FIGS. 6 and 7. The door is provided with the same recess 68 but the edge guard extends fully over and around the end of the door edge flange so that the portion 88 is disposed against the inside of the door edge. In this way, the edge guard has a somewhat J-shaped cross section.

FIGS. 11 through 14 illustrate various possible configurations for a door edge and an immediately adjacent body member such as a door pillar. In each of these embodiments, the door is identified by the reference numeral 82 and the pillar by the reference numeral 84.

Figure 11:
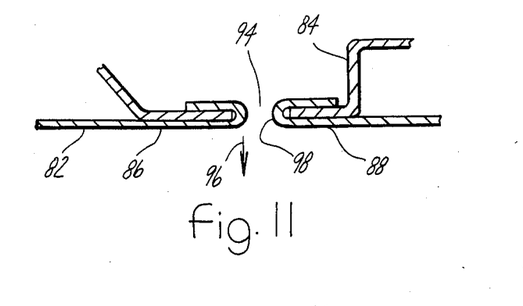
FIGS. 11, 12, 13 and 14 are respective fragmentary transverse cross sectional views illustrating various door and pillar configurations.

In FIG. 11, no recessess are provided in the outer surfaces of the door and pillar and hence the exterior door surface 86 is flush with the exterior pillar surface 88.

Figure 12:
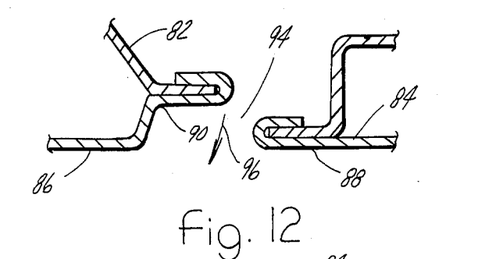

FIG. 12 illustrates a configuration in which the door is provided with a recess 90 along its trailing edge. The pillar is the same as in FIG. 11.

Figure 13:
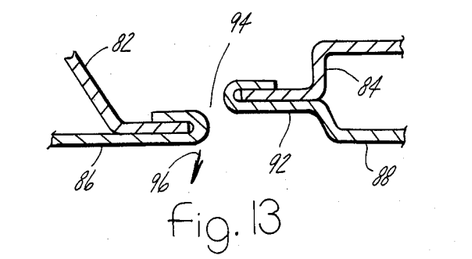

In FIG. 13, the door is the same as FIG. 11 but now the pillar is provided with a recess 92.

Figure 14:
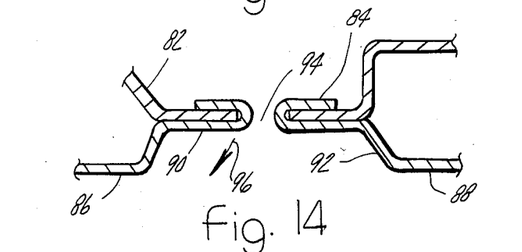

In FIG. 14, both door and pillar are provided with respective recesses 90 and 92.

The showings of FIGS. 11 through 14 are representative of possibilities for the body design in the area of the crack 94 which exists between the door and pillar. FIGS. 11 through 14 illustrate the door in the closed position and the arrow 96 indicates the direction of door swing toward an open position. For each of the four configurations of FIGS. 11 through 14, it is possible to employ an edge guard which is effective to conceal the crack 94 between the door and pillar.

One possible way of concealing the crack is by having the edge guard such as shown in FIG. 10 just contact the edge 98 of the pillar in the closed position of the door.

Another possibility is to have the edge guard overlap the pillar.

Figures 15, 16A, 16B:
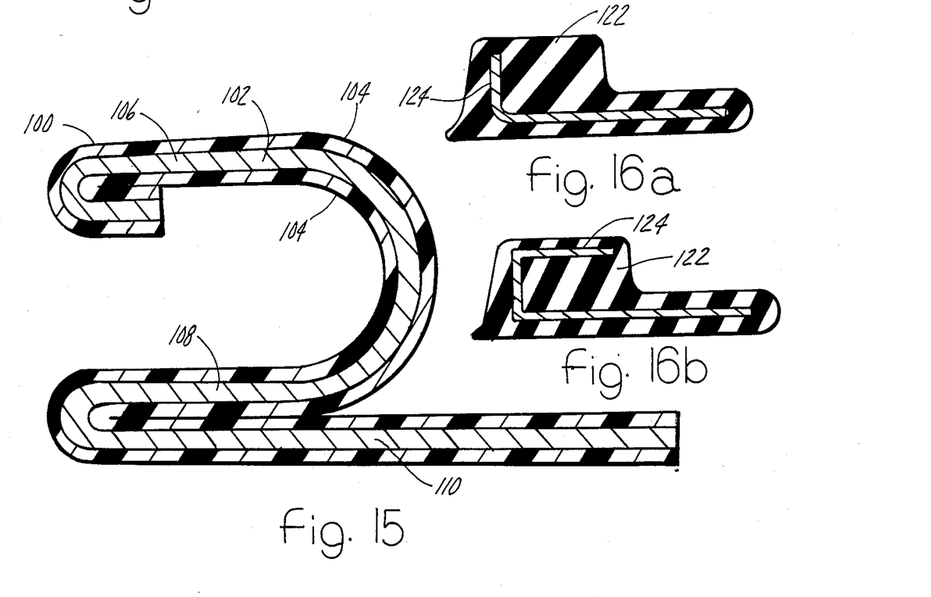

FIG. 15 illustrates an example of an edge guard which when installed on the door edge may be used to conceal crack 94. The edge guard 100 of FIG. 15 comprises a metal member 102 which is fully encapsulated both inside and out with insulation 104. This insulation may be any suitable material such as a vinyl or other type of plastic. The illustrated edge guard is of the type which is self-retaining when applied to the door edge. It comprises a general U-shaped portion fitting onto the door edge with the self-retention force being applied by the inner and outer legs 106, 108 respectively. Edge guard 100 differs from other insulated edge guards in that extending rearwardly from the distal end of the outer leg 108 is reversely turned extension 110 which extends from the distal end of the outer leg rearwardly to overlap the U-shaped portion of the edge guard as well as extend rearwardly beyond the same so as to overlap the adjacent pillar when the edge guard is installed on the door. Extension 110 runs the full length of the edge guard. In this way, the extension 110 will conceal the crack 94 and also preferably overlap the adjacent pillar.

The edge guard 100 embodies the protective and ornamental and functional characteristics of applicant's insulated edge guards described in other of his patents and pending applications. Because the exterior is covered by insulation, it offers the potential for providing any desired color matching or contrasting with the painted door and pillar.

It will be appreciated that the exact shape of the cross section may be varied to a certain extent to accommodate the particular configuration of door and pillar. For example, FIG. 15 is well suited for application to either FIG. 11 or FIG. 14. In FIG. 11, the outer leg 108 and extension 110 will be slightly raised relative to the exterior surfaces 86, 88 of the door and pillar. In FIG. 14, the outer surface of the extension 110 may be made substantially flush with the exterior surfaces 86, 88 of the door and pillar.

The particular manufacturing procedure for fabricating the edge guard of FIG. 15 may also be any of the techniques contained in applicant's patents and pending patent applications. While it is certainly preferable to cover both interior and exterior in an encapsulated fashion as shown, it will be appreciated that partial selective covering may be employed if desired.

Figure 16:
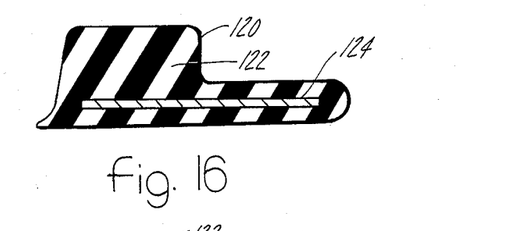
FIG. 16 is a transverse cross sectional view of another embodiment of edge guard.
Figure 16B:
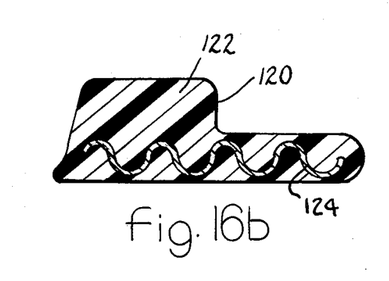

FIG. 16 illustrates another embodiment 120 of edge guard which is particularly suited for use in conjunction with a recess. The illustrated construction depicted in FIG. 16 comprises a molded body 122 of plastic or other suitable material within which is embedded a stiffening insert 124. The illustrated stiffening insert is a straight cross section adjacent the exterior surface of the edge guard. The illustrated edge guard in FIG. 16 is well suited to fit within the recess 90 of the door and to overlap the immediately adjacent pillar. Any suitable procedure for securing the edge on the door edge may be employed.

Where the pillar also contains a recess such as in FIG. 14 the edge guard can present a flush exterior surface which is flush with the exterior surfaces 86, 88 of both door and pillar. Where the pillar does not contain a recess, the edge guard may stop short so that it just touches the edge of the pillar when the door is closed, or alternatively it may be slightly deflected so that if overlapping the door it may deflect slightly when the door is closed.

In all instances, the edge guard is effective to protect the door edge when the door is swung open, and it is also effective in concealing the crack between door and pillar yielding an aesthetically pleasing appearance.

FIGS. 16a, 16b, and 16c disclose the same general shape for the edge guard as in FIG. 16 but with differently shaped inserts. In FIG. 16a, the insert has an L-shaped cross section while in FIG. 16b it is shown with a J-shaped cross section. In FIG. 16c, it has a corrugated cross section. Once again the particular shape and/or necessity of an insert will depend upon manufacturing considerations.

Figure 17:
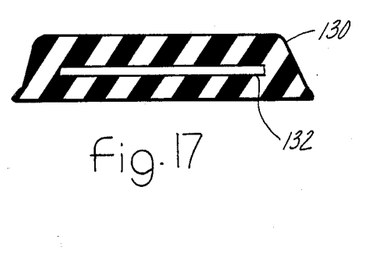
FIG. 17 is a further embodiment of edge guard.

FIG. 17 illustrates another cross sectional shape for an edge guard 130 which is particularly well suited for the FIG. 14 configuration wherein recesses are provided in both door and pillar. The insert 132 in FIG. 17 has a straight cross section.

Figure 18:
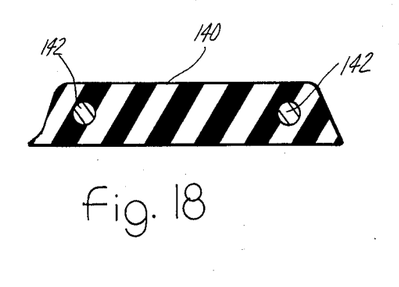
FIG. 18 is a still further embodiment of edge guard.

FIG. 18 illustrates another cross section 140 of the same overall shape as in FIG. 17 but instead of the single insert has a pair of wires, rods or the like 142 running along the lengthwise side edges and embedded within the non-metallic material forming the body of the edge guard.

Figure 19:
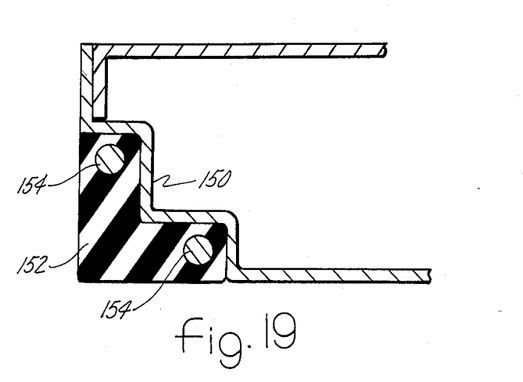
FIG. 19 is a fragmentary transverse cross section through another door modification including an edge guard installed thereon.

FIG. 19 illustrates a modified form of door construction containing another edge guard. The door is constructed with an L-shaped indentation 150 at its outer corner which receives an L-shaped door edge guard 152. The outer surfaces of the door and the exterior surfaces of the edge guard are flush. The edge guard is applied to the door through any of the aforementioned means or procedures. Rigidifying rods 154 are incorporated within the body of the edge guard as shown.

Figure 20:
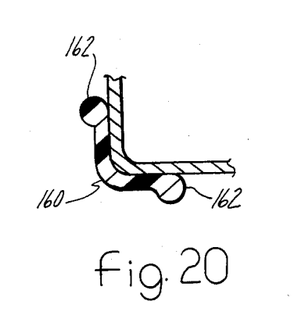
FIG. 20 is a view similar to FIG. 19 illustrating another embodiment.
Figure 20A:
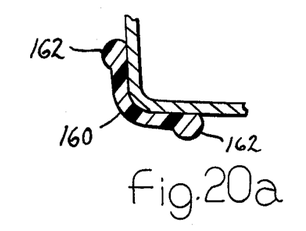
Figure 20B:
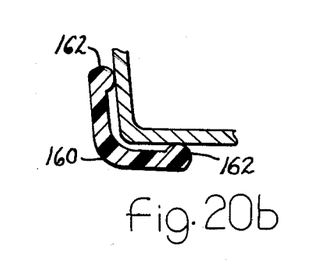

FIG. 20 illustrates still another configuration in which the door edge is not provided with an indentation. The edge guard 160 is in the form of an L-shaped cross section which covers the outer corner of the door. The ends of the edge guard legs may include beads 162 which may contain rigidifying insert rods as in FIG. 19. The embodiment of FIG. 20 may be bonded or otherwise secured to the door through the use of any of the aforedescribed means or procedures. FIGS. 20a and 20b show alternate constructions of FIG. 20 particularly of the beads.

FIGS. 21 through 25 should be considered together as they relate to a still further form of edge protection. In this embodiment, the edge guard is not a preformed cross section but rather is formed to the finished cross sectional shape during the installation procedure.

Figures 21, 22:
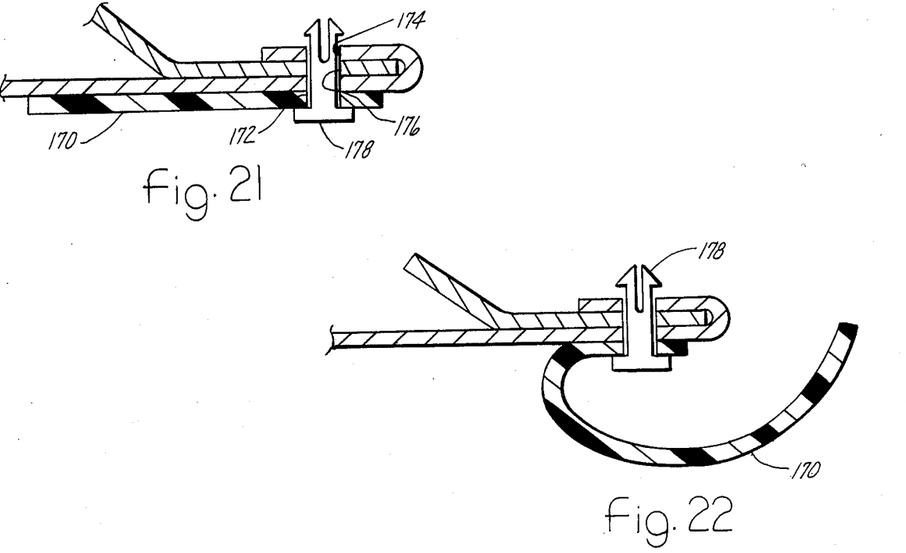
FIG. 21 is a cross sectional view illustrating one step in the installation of another embodiment of edge guard on a door edge.
FIGS. 22 and 23 illustrate respective stages further to that of FIG. 21.

FIG. 21 shows the initial fabrication process wherein the edge guard is formed from a flat strip 170 of suitable plastic or other material. The width and thickness of the strip are chosen so that the final cross sectional shape which appears in FIG. 23 (to be subsequently explained) can be achieved.

Figure 25:
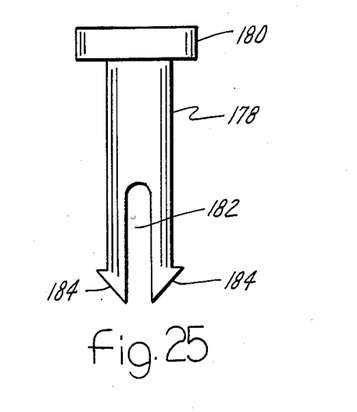
FIG. 25 is a view of an element used in connection with the construction illustrated in FIGS. 21-24.

Adjacent both of the side edges of the strip, the strip is provided with a series of holes. The two series of holes are identified by the numerals 172, 174. These holes are intended to register with a corresponding pattern of through holes 176 in the door edge such as the original patterns shown in FIG. 3. With one hole pattern 172 aligned with the door hole pattern, fasteners 178, such as that in FIG. 25, are inserted through from the outside. Each fastener comprises a head 180 which is disposed over the outside of the plastic strip when the strip is in the condition shown in FIG. 21. The fasteners are fully inserted through the door holes so that the distal ends of the fasteners shanks project through the opposite inside of the door edge. It will be observed in FIG. 25 that the distal end of the fastener shank is bifurcated by a central slot 182 and that the ends of the bifurcations are provided with angled trips 184 which allow the ends to deflect inwardly while passing through the door holes and then to flex outwardly after having been fully inserted. In this way, the fasteners will be retained on the door.

Having installed all the required fasteners in the manner shown in FIG. 21, the plastic strip is now wrapped around the door edge in the manner shown in FIG. 22. When fully wrapped around the door edge, the other series of holes 174 in the strip will register with the distal ends of the fasteners which stick out through the holes in the door on the inside of the door edge. The further series of holes 174 are fitted over the projecting end tips of the fasteners with the bifurcated tips deflecting out of the way as the holes are increasingly inserted onto the tips. When fully inserted, the strip clears the tips 184 and the tips once again flex outwardly thereby locking the edge of the strip in place against the inside edge of the door.

Figure 23:
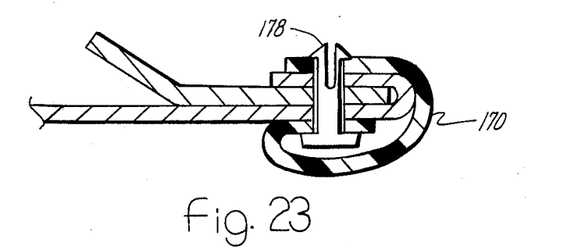
Figure 24:
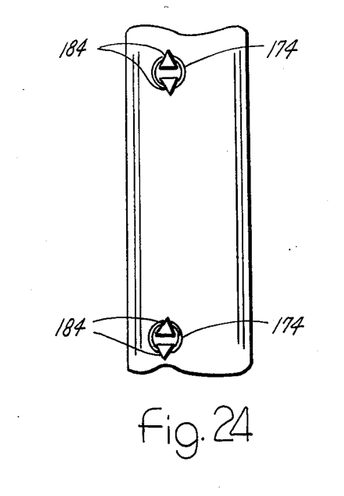
FIG. 24 is an elevational view of FIG. 23.

FIGS. 23 and 24 illustrate the final assembled condition. It will be observed that the heads of the fasteners are fully concealed by the wrapping around of the strip in the manner shown. Hence, the installed edge guard presents a pleasing appearance with concealment of the fasteners.

An advantage of this construction is that it is unnecessary to use anything other than a strip of plastic to form the edge guard with the retention being provided by the fasteners. The plastic may come in any of a range of desired colors thereby rendering the fabrication of a door edge guard to a desired color especially easy and convenient. The edge guard therefore is not subjected to extensive manufacturing procedures beforehand, except as necessary to provide the required dimensions of the strip and the placement of the holes. In other words, no roll-forming, co-extrusion or other techniques are required. Bonding procedures are also not essential since adequate retention can be obtained by the fasteners. This construction thereby provides further improvement in edge guard manufacture.

FIGS. 9a and 9b illustrate modified forms for the insulating element 84. The element 84 may be a very thin walled extrusion and in order to provide a more substantial body, beads are added along the marginal side edges. In this way, the nominal thickness of the insulating material may be kept thin, yet processing of the insulating material is facilitated by the beads. For example notches are made in the inner leg to facilitate conformance to a door edge contour, the notching process may be facilitated by inclusion of the beads.

The beads are identified by the reference numeral 84A in each of FIGS. 9a and 9b. FIG. A illustrates the beads are disposed toward the outside, while in FIG. 9b the beads are disposed toward the inside. Various procedures for fabricating insulating elements such as shown in FIGS. 9a and 9b may be employed in accordince with principles of the invention.

While a preferred embodiment of the invention has been disclosed, it will be appreciated that principles of the invention are applicable to other embodiments.

What is claimed is:

1. In combination with the trailing edge of a swinging closure of a vehicle wherein the trailing edge is formed by wrapping an edge portion of an outer body panel around an edge portion of an inner body panel, and an edge guard of generally C-shaped cross section is installed on said trailing edge, said edge guard having inner and outer legs, the improvement which comprises said edge guard being a non-metallic material and mechanical means on said trailing edge for retaining said edge guard on said trailing edge, said mechanical means comprising enlargements formed in said outer body panel along said trailing edge on opposite sides thereof, and in which said edge guard fits over and around said enlargements with the edge guard's legs' distal ends being disposed beyond said enlargements and against opposite sides of said outer body panel along said trailing edge.

2. The combination set forth in claim 1 in which the edge guard is further secured to the edge by adhesive and/or bonding.

3. In combination with the trailing edge of a swinging closure of a vehicle wherein the trailing edge is formed by wrapping an edge portion of an outer body panel around an edge portion of an inner body panel, and an edge guard of generally C-shaped cross section is installed on said trailing edge, said edge guard having inner and outer legs, the improvement which comprises said edge guard being a non-metallic material and the trailing edge of the swinging closure being provided with a pattern of holes on opposite sides thereof, said holes being formed in at least said outer body panel and in which said edge guard is provided with integral tips projecting inwardly of the edge guard on the insides of both legs, said tips constituting fasteners for the edge guard and having a pattern corresponding to the pattern of holes in the trailing edge and said tips being inserted into the pattern of holes in said trailing edge on opposite sides thereof.

4. In combination with the trailing edge of a swinging closure of a vehicle wherein the trailing edge is formed by wrapping an edge portion of an outer body panel around an edge portion of an inner body panel, and an edge guard of generally C-shaped cross section installed on said trailing edge, said edge guard having inner and outer legs, the improvement which comprises one or more weldments provided on the inside of the trailing edge, said weldments being welded to that portion of the outer body panel which has been wrapped around the edge portion of the inner body panel, and said weldments having hook-like projections, said edge guard having means on its inner leg interlocking with said one or more weldments at said hook-like projections thereof.

5. In a vehicle having a swinging member with a trailing edge, said vehicle also having an adjacent body member adjacent the trailing edge when the swinging member is in the closed position, said adjacent body member having an edge which is juxtaposed to said trailing edge when the swinging member is in the closed position, and said members having exterior surfaces forming the exterior styling appearance of the vehicle, the improvement which comprises a recess in said swinging member extending along said trailing edge on the side thereof which is toward the exterior and an edge guard on said trailing edge, said edge guard having a cooperative association with said recess such that a portion of said edge guard covers said recess and presents an exterior surface which is flush with the exterior surfaces of said members when the swinging member is in the closed position.

6. The improvement set forth in claim 5 in which said edge guard is configured to cover the gap which would otherwise exist between the trailing edge of the swinging member and the adjacent body member when the swinging member is in the closed position.

7. The improvement set forth in claim 6 in which the edge guard is configured to also overlap the adjacent body member when the swinging member is in the closed position, said adjacent body member having on its outside a recess extending along its juxtaposed edge within which the overlapping portion of said edge guard is disposed when the swinging member is in the closed position.

8. The improvement set forth in claim 5 in which said edge guard comprises a non-metallic body and including an insert encapsulated within said non-metallic body to provide stiffening.

9. The improvement set forth in claim 5 in which the edge guard comprises a U-shaped section fitting onto the trailing edge of the swinging member and an extension from said U-shaped cross section extending to cooperatively associate with the adjacent body member.

10. The improvement set forth in claim 9 in which said extension overlaps said adjacent body member, said adjacent body member having on its outside a recess extending along its juxtaposed edge within which the overlapping portion of said edge guard is disposed when the swinging member is in the closed position.

11. The improvement set forth in claim 5 in which said edge guard comprises a main body portion which lodges in and fills said recess.

12. The improvement set forth in claim 11 in which said edge guard also includes a portion which extends around and against the trailing edge on the side thereof opposite the side containing said recess.

13. In combination with the trailing edge of a swinging closure, an edge guard formed from a flat strip into a general U-shaped cross section in which one marginal edge of the strip is disposed against one side of the trailing edge, headed fasteners are passed through apertures in that marginal edge of the strip, and through aligned through-apertures in the trailing edge of the swinging closure, and the distal ends of the fasteners project beyond the trailing edge's apertures, and the strip is wrapped outwardly around the heads of the fasteners to cover same and continues on around the trailing edge with the opposite marginal edge of the strip having apertures fitting onto the distal ends of said fasteners so that said opposite marginal edge of the strip is disposed over the opposite side of the trailing edge, and means on the distal ends of the fasteners for retaining said opposite marginal edge of the strip whereby the general U-shape is created from the flat strip.

14. In combination with the trailing edge of a swinging closure of a vehicle, said trailing edge having an angled outer corner comprising a recess which in transverse cross section has an angled shape comprising two recess legs which are angularly related, an edge guard for said corner having a generally angled cross section protectively covering said corner by having two angularly related legs which lodge in the corresponding recess legs.

15. The combination set forth in claim 14 in which said edge guard fits within said recess so as to present a flush appearance with the outer surface of the swinging closure.

16. In a vehicle having a swinging member with a trailing edge, said trailing edge having opposite sides, one of which is on the outside of the swinging member and the other of which is on the inside of the swinging member and said swinging member have an exterior surface presenting the exterior styling appearance, the improvement which comprises a recess formed in the outside of said trailing edge and an edge guard comprising a main body portion of non-metallic material filling said recess, said non-resilient material presenting an exterior surface which is flush with and forms a continuation of the exterior surface of said swinging member.

17. The improvement set forth in claim 16 in which said swinging member has a cooperative association with an adjacent body member when the swinging member is in its closed position, said adjacent body member having a recess juxtaposed to the recess in the trailing edge of the swinging member with the two recesses being separated by a gap, and said adjacent body member having an exterior surface adjacent its recess, said edge guard having an extension portion extending from its main body portion to bridge said gap and be disposed in the recess in said adjacent body member when the swinging member is in the closed position, said extension portion of said edge guard having an exterior surface which is flush with the exterior surface of said adjacent body member when the swinging member is in the closed position.

18. In a vehicle having a swinging member with a trailing edge and said vehicle also having an adjacent body member adjacent the trailing edge when the swinging member is in the closed position, said members having exterior surfaces forming the exterior styling appearance of the vehicle, the improvement which comprises an edge guard having a U-shaped portion fitting onto the trailing edge, said edge guard having inner and outer legs disposed against opposite sides of the trailing edge and said edge guard further including an integral extension extending from the distal end of the outer leg, overlying the outer leg, and extending between the swinging member and the adjacent body member when the swinging member is in the closed position so as to overlap the adjacent body member and thereby conceal any gap which may exist between the two members when the swinging member is in closed position.

19. The improvement set forth in claim 18 in which said adjacent body member comprises an edge which is juxtaposed to said trailing edge when the swinging member is in the closed position, said juxtaposed edge containing a recess within which the extension of said edge guard is disposed when the swinging member is in the closed position.

20. In a vehicle having a swinging member with a trailing edge, said vehicle also having an adjacent body member adjacent the trailing edge when the swinging member is in its closed position, said adjacent body member further having an edge which is juxtaposed to said trailing edge when the swinging member is in the closed position, said members having exterior styling surfaces forming the styling appearance of the vehicle, the improvement which comprises a recess formed in the trailing edge on its exterior side, and an edge guard comprising a main body portion of non-metallic material disposed in said recess to protect said trailing edge.

21. The improvement set forth in claim 20 including an integral extension from said main body portion to cover any gap which exists between the swinging member and the adjacent body member when the swinging member is in the closed position.

22. The improvement set forth in claim 21 in which said adjacent body member comprises a recess formed in its juxtaposed edge and said extension portion of said edge guard is disposed within the recess of said juxtaposed edge when the swinging member is in the closed position.

23. The improvement set forth in claim 22 in which said edge guard has an exterior surface portion which is flush with said exterior styling surfaces when the swinging member is in closed position.

* * * * *